US012647739B2

(12) United States Patent
Ding et al.

(10) Patent No.: US 12,647,739 B2
(45) Date of Patent: Jun. 2, 2026

(54) CHARGING CONTACT CONNECTION, CHARGING CONTACT SYSTEM AND ELECTRICAL DEVICE

(71) Applicant: Sivantos Pte. Ltd., Singapore (SG)

(72) Inventors: Lit Song Glen Ding, Singapore (SG); Yu Chen, Singapore (SG)

(73) Assignee: Sivantos Pte. Ltd., Singapore (SG)

( * ) Notice: Subject to any disclaimer, the term of this patent is extended or adjusted under 35 U.S.C. 154(b) by 157 days.

(21) Appl. No.: 18/543,049

(22) Filed: Dec. 18, 2023

(65) Prior Publication Data

US 2024/0205619 A1 Jun. 20, 2024

(30) Foreign Application Priority Data

Dec. 16, 2022 (EP) .................................... 22214056
May 5, 2023 (EP) .................................... 23171848

(51) Int. Cl.
*H04R 25/00* (2006.01)

(52) U.S. Cl.
CPC ... *H04R 25/556* (2013.01); *H04R 2225/0213* (2019.05); *H04R 2225/31* (2013.01)

(58) Field of Classification Search
CPC .......... H04R 25/556; H04R 2225/0213; H04R 2225/31
See application file for complete search history.

(56) References Cited

U.S. PATENT DOCUMENTS

2019/0082741 A1* 3/2019 Verleur ..................... H02J 7/00
2021/0029475 A1* 1/2021 Bin Shith .............. H01R 13/10
2022/0360915 A1* 11/2022 von Mansberg ..... H04R 1/1025
2024/0143087 A1* 5/2024 Goh ........................ G06F 3/016

FOREIGN PATENT DOCUMENTS

CN 206922474 U * 1/2018
CN 212485668 U 2/2021
EP 3364506 A1 8/2018
EP 3771225 A1 1/2021
WO WO-2021015998 A1 * 1/2021 ........... H04R 25/602

OTHER PUBLICATIONS

Machine translation of CN206922474U (Year: 2018).*

* cited by examiner

*Primary Examiner* — Andrew Sniezek
(74) *Attorney, Agent, or Firm* — Laurence A. Greenberg; Werner H. Stemer; Ralph E. Locher

(57) ABSTRACT

A charging contact connection for a charger of an electrical device, in particular a hearing aid, includes a central contact pin for contacting a first counter-contact of a counter-contact connection, and a permanent-magnetic magnet element enclosing the contact pin for magnetically attracting the counter-contact connection. A contact element disposed on the front face facing the counter-contact connection guides and focuses the magnetic field of the magnetic element in the direction of a second counter-contact of the counter-contact connection. A charging contact system and an electrical device are also provided.

16 Claims, 5 Drawing Sheets

CHARGING CONTACT CONNECTION, CHARGING CONTACT SYSTEM AND ELECTRICAL DEVICE

CROSS-REFERENCE TO RELATED APPLICATION

This application claims the priority, under 35 U.S.C. § 119, of European Patent Applications EP 22 214 056.8, filed Dec. 16, 2022, and EP 23 171 848.7, filed May 5, 2023; the prior applications are herewith incorporated by reference in their entirety.

FIELD AND BACKGROUND OF THE INVENTION

The invention relates to a charging contact connection for a charger of an electrical device, in particular a hearing aid. The invention further relates to a charging contact system and to an electrical device.

Hearing aid devices are wearable hearing aids that are used in particular to care for the hard-of-hearing or hearing impaired. In order to meet the numerous individual needs, different configurations of hearing aid devices such as behind-the-ear hearing aids (BTE) and hearing aids with an external receiver (RIC: receiver in the canal) as well as in-the-ear hearing aids (ITE), for example also concha hearing aids or in-channel hearing aids (CIC: completely-in-channel, IIC: invisible-in-the-channel) are provided. The hearing aids listed as examples are worn on the outer ear or in the ear canal of a hearing aid device user. In addition, bone conduction hearing aids, implantable or vibrotactile hearing aids are also available on the market, however. The damaged sense of hearing is stimulated in that case either mechanically or electrically.

Such hearing aids have in principle an input converter, an amplifier and an output converter as basic (hearing aid) components. The input converter is usually an acoustoelectric converter, such as a microphone. The output converter is usually implemented as an electro-acoustic converter, for example as a miniature loudspeaker (receiver), or as an electromechanical converter, such as a bone conduction receiver. The amplifier is usually integrated into a signal processing device.

Hearing aids are usually powered by batteries. The operating time is limited depending on the energy content of the batteries and the requirements of the hearing aid. In view of the general trend toward miniaturization, small size batteries are preferred, which additionally limits their energy content. In order to avoid the frequent replacement of used batteries, hearing aids can be operated with rechargeable batteries (accumulators) such as nickel-metal hydride (NiMH) or lithium-ion (Li-ion) batteries.

Hearing aids powered by rechargeable batteries often have connectors to make electrical contact with a charger and thus to be able to leave them inside the hearing aid when charging the rechargeable batteries. Proprietary connectors are often used in that case. However, it is now known from the cellphone sector that a large number of providers use standard systems. In some cases, devices with rechargeable batteries also use jack plugs, as they are known. These systems often have the disadvantage in that case that the plug-in paths required to produce the contacting are usually comparatively long and thus it is quite difficult to preferably "blindly" find and easily connect the corresponding connections, in particular in chargers having charging trays. That is why relatively flat spring contacts are often used in that area. That is known, for example, in the area of wireless landline phones.

A charging contact connection for a charger of a hearing aid is known from European Patent Application EP 3 771 225 A1, corresponding to U.S. Publication No. 2021/0029475. The charging contact connection has a magnet for realizing a magnetic holding force in the contacted state in that case.

In charging contact systems with such a holding magnet, the magnetic holding force may be comparatively low. Increasing the holding magnet and/or changing the quality of the magnet can improve that holding force, but that has a negative impact on the size and the costs of the hearing aid and the charger. Furthermore, the magnetic flux generated by a stronger magnet would pose a greater risk of damage to a hearing aid receiver.

SUMMARY OF THE INVENTION

It is accordingly an object of the invention to provide a particularly suitable charging contact connection for a charger of an electrical device, in particular a hearing aid, a particularly suitable charging contact system and a particularly suitable electrical device, which overcome the hereinafore-mentioned disadvantages of the heretofore-known devices of this general type.

With the foregoing and other objects in view there is provided, in accordance with the invention, a charging contact connection for a charger of an electrical device, in particular a hearing aid, comprising a central contact pin for contacting a first counter-contact of a counter-contact connection, a permanent-magnetic magnet element for magnetically attracting the counter-contact connection, which encloses the contact pin, and a contact element disposed on the front face facing the counter-contact connection for guiding and focusing the magnetic field of the magnetic element in the direction of a second counter-contact of the counter-contact connection.

With the objects of the invention in view, there is also provided a charging contact system for an electrical device, in particular for a hearing aid, comprising a charging contact connection according to the invention.

With the objects of the invention in view, there is concomitantly provided an electrical device, in particular a hearing aid, comprising a counter-contact connection for electrically contacting a charging contact connection according to the invention, wherein the counter-contact connection has a first counter-contact for contacting the contact pin and a second counter-contact for contacting a contact surface of the contact element.

Advantageous refinements and further developments are the subject matter of the dependent claims. The advantages and refinements listed with regard to the charging connection contact are also expediently transferable to the charger and/or the electrical device and vice versa.

The conjunction "and/or" here and in the following is to be understood to mean that the features linked by this conjunction can be implemented both jointly and as alternatives to one another.

The present invention is based on the earlier European Patent Application EP 3 771 225 A1, corresponding to U.S. Publication No. 2021/0029475. The content of that earlier application is fully incorporated in the instant application by reference.

The charging contact connection according to the invention is provided, suitable and configured for a charger of an electrical device, in particular a hearing aid.

The charging contact connection in this case has a central contact pin for contacting a first counter-contact of a counter-contact connection. The counter-contact connection is disposed in this case in particular at the electrical device or at the hearing aid. The contact pin can be constructed as a spring contact pin with a spring-loaded contact tip (pogo pin).

The charging contact connection further includes a permanent-magnetic magnet element (holding magnet, contact magnet) for magnetically attracting the counter-contact connection. The magnetic element encloses the contact pin in this case. In other words, the magnetic element surrounds the contact pin at least in sections. The magnetic attraction realizes a magnetic holding force in the contacted state of the charging contact connection with the counter-contact connection. Thus, due to the magnetic element, the charging contact connection and the counter-contact connection need only be positioned "close" to each other for contacting purposes. At a sufficiently small distance, the magnetic attracting or holding force enables an almost automatic coupling of the mutually assigned connection contacts.

In order to improve the magnetic attracting/holding force, a contact element is disposed according to the invention, which guides and focuses the magnetic flux of the magnetic element to a metallic second counter-contact of the counter-contact connection. The for example ferritic contact element is preferably made of a ferrimagnetic or ferromagnetic material. The contact element is disposed on a front face of the magnetic element facing the counter-contact connection and is constructed and configured for guiding and focusing the magnetic field of the magnetic element in the direction of the second counter-contact.

The contact element is preferably electrically conductive and has a contact surface which, in the contacted state with the counter-contact connection, is in electrically conductive direct contact with the second counter-contact. The contact element thus forms an interface contact to the counter-contact connection. Thereby a particularly suitable charging contact connection is implemented.

In an advantageous embodiment, the contact element has a smaller diameter than the magnetic element. This means that the in particular ferritic contact element has an outer diameter which is always smaller than the diameter of the magnetic element. The contact element is therefore narrower than the magnetic element at any point. This improves the guidance and focusing of the magnetic field lines or the magnetic flux.

In a preferred further development, the diameter of the contact element is tapered along the contact pin starting from the magnetic element. The contact element thus has, for example, a conical or frustoconical shape. By reducing or tapering the in particular ferritic interface contact, the magnetic flux can be better directed and guided to the second counter-contact.

In a particularly practical refinement, the contact element has two element halves disposed at a distance from each other. The interface contact is thus divided into two parts. Preferably, the magnetic element in this case is a ring magnet, in particular a ring magnet with two ring magnet halves (half magnets), wherein each ring magnet half is assigned one element half. Appropriately, the magnetic poles of the ring magnet halves are disposed in opposite directions to each other in this case. By dividing this interface contact and the magnetic element into two parts or halves, as well as due to the alternating polarity of the two ring magnet halves, the range of influence of the magnetic flux is reduced without this adversely affecting the magnetic strength.

The charging contact system according to the invention is used for charging the electrical device, in particular a hearing aid, and for this purpose has the charging contact connection described above and, if appropriate, the counter-contact connection assigned to the electrical device or hearing aid. "Charging an electrical device" is understood in this case and in the following text in particular to mean charging (up) an energy storage system of the device with electrical power.

For example, the charging contact system can be just a charger with the charging contact connection, or a system with a charger and an electrical device with the respective connections. The charging contact system or the charger may in particular be a charging cable in this case, in which one cable end flows into the connection contact system and the other cable end is connected or connectable to an energy source or to a connecting device (e.g. power supply) to such an energy source. The energy source can be in this case, for example, also an accumulator, for example a power bank, that is, an electrical device which can provide a charging energy (including, for example, a laptop or the like, which can also supply other electrical devices with power via a USB connection). The charger can also be a portable (rechargeable) battery module.

The electrical device according to the invention is preferably constructed as a hearing aid. The device has a counter-contact connection for electrically contacting the charging contact connection described above, wherein the counter-contact connection has a first counter-contact for contacting with the contact pin and a second counter-contact for contacting with a contact surface of the contact element.

The first counter-contact is preferably formed at least in sections to be dome-like (i.e. in the form of a preferably spherical recess), so that a direct-contact surface between the free end of the contact pin and the first counter-contact is dimensioned to be as large as possible. Preferably, the second counter-contact is disposed similar to the contact element concentric to the first counter-contact and surrounds it, for example, closed in the shape of a ring. This advantageously allows even in the (contact) state coupled to the charging contact connection a relative rotation of the two connections with respect to each other (i.e. in particular about the rotation axis of the charging contact connection which coincides with the contact pin).

Other features which are considered as characteristic for the invention are set forth in the appended claims.

Although the invention is illustrated and described herein as embodied in a charging contact connection, a charging contact system and an electrical device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
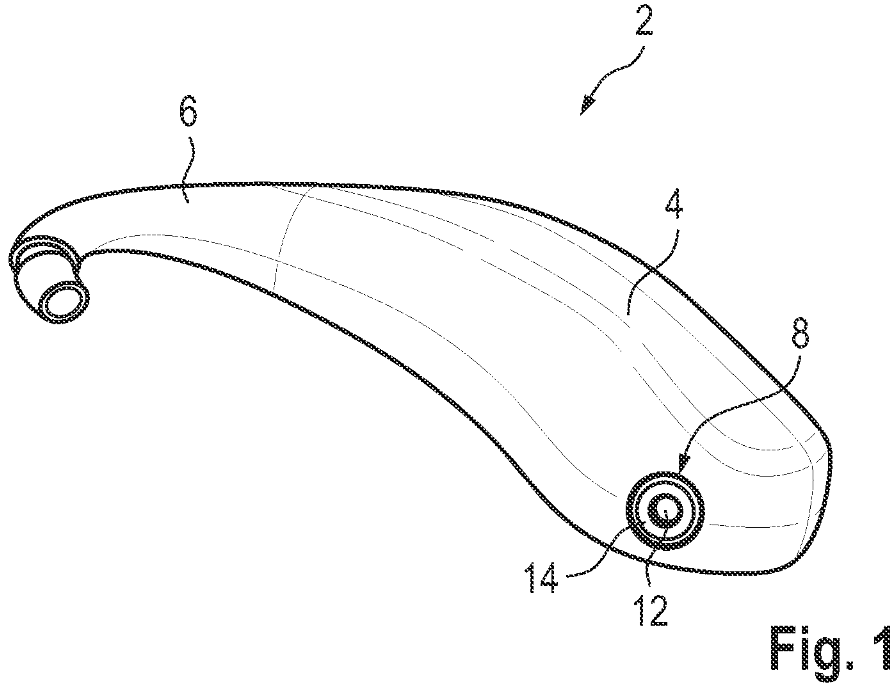
FIG. 1 is a diagrammatic, perspective view of a hearing aid having a counter-contact connection for connecting a charging contact connection for charging a rechargeable battery integrated in the hearing aid.

Referring now in detail to the figures of the drawings, in which mutually corresponding parts and variables are marked throughout with the same reference signs, and first, particularly, to FIG. 1 thereof, there is seen an electrical device 2. The device 2 is in this case in particular constructed as a hearing aid and hereinafter also referred to as such. The hearing aid is an example of a behind-the-ear hearing aid (BTE).

The hearing aid 2 has a (hearing aid) housing 4 and attached to it a support hook 6. The hearing aid 2 includes a rechargeable battery for the operation of its electrical components (microphones, a loudspeaker, a signal processor and, if appropriate, a communication module, which are not illustrated further). In order not to have to remove them from the housing 4 for charging, the hearing aid 2 has a charging connection 8, which forms a counter-contact connection to a charging contact connection 10 described in more detail below. Furthermore, the hearing aid 2 also has assigned to the rechargeable battery a charging electronic system, which is configured to monitor the charging process and the charge status of the battery.

Figure 2:
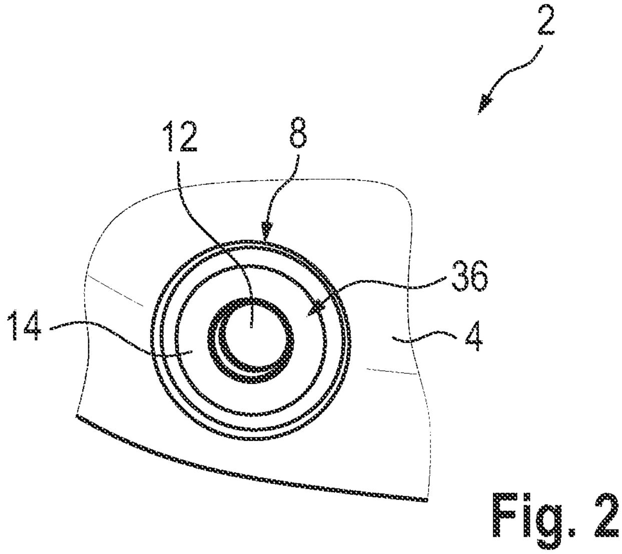
FIG. 2 is an enlarged, fragmentary, perspective view of the counter-contact connection.

The charging connection 8 has two concentrically disposed contact elements, specifically a central, first contact piece 12 and a second contact piece 14 surrounding the former in the manner of a ring (FIG. 2). The contact piece 12 is constructed at least in sections to be dome-like. The first and the second contact piece 12, 14 each form in this case a counter-contact for corresponding contact elements 16, 18 of the charging contact connection 10.

A first embodiment of the charging contact connection 10 is explained in more detail below with reference to FIGS. 3 to 5.

The contact elements 16, 18 of the charging contact connection 10, which is also referred to below in short as the charging plug, are also disposed concentrically to each other. The central contact element 16 is constructed as a contact pin, in particular as a spring contact pin or pogo pin, wherein the contact element 18 encloses the contact pin 16 circumferentially like a sleeve. The contact element 18 has a front-face, ring-shaped contact surface 20, wherein a free end of the contact pin 16 axially projects up or protrudes above the contact surface 20. The contact surface 20 is disposed in this case in a plane perpendicular to the longitudinal direction (axial direction) of the contact pin 16. The contact pin 16 is kept insulated from the contact element 18 by an electrically non-conductive insulating sleeve 22.

The contact elements 16, 18 are at least partially housed in an insulating housing 24. The approximately cylindrical housing 24 has a lateral radial arm 26 with a feed-through opening 28, through the use of which the housing 24 or the charging plug 10 can be attached, for example, in a charger (not shown in more detail).

The contact element 18 is in contact with a contact ring 30 within the housing 24. The contact ring 30 has two contact tabs 32 or contact feet, which are bent or angled parallel to the contact pin 16. In the assembled state, the contact element 18 is in contact with a charging electronic system via the contact ring 30 and the contact tabs 32.

Within the housing 24, the contact pin 16 is surrounded by a permanent-magnetic magnet element 34 in the form of a ring magnet or a magnetic sleeve. The contact tabs 32 are guided in this case parallel, for example, along an outer surface of the magnetic element 34.

The contact piece 14 (optionally also the contact piece 12) is preferably formed of a ferrimagnetic or ferromagnetic material, so that the magnetic element 34 can exert thereon a magnetic attracting force. The magnetic attraction realizes a magnetic holding force in the contacted state of the charging plug 10 with the charging connection 8. In the contact state, the contact pin 16 engages its free-end side in the dome-like or socket-like contact piece 12, wherein the contact surface 20 is in direct contact with a contact surface 36 of the contact piece 14.

In order to improve the magnetic attracting/holding force, the contact element 18 is also made of a ferrimagnetic or ferromagnetic material to guide and focus the magnetic flux of the magnetic element 34 in the direction of the contact piece 14 (or in a direction perpendicular to the contact surface 20). The contact element 18 is disposed in this case on the front face of the magnetic element 34. The contact element 18 and the magnetic element 34 surround the contact pin 16 closed in the form of a ring in each case.

Figure 5:
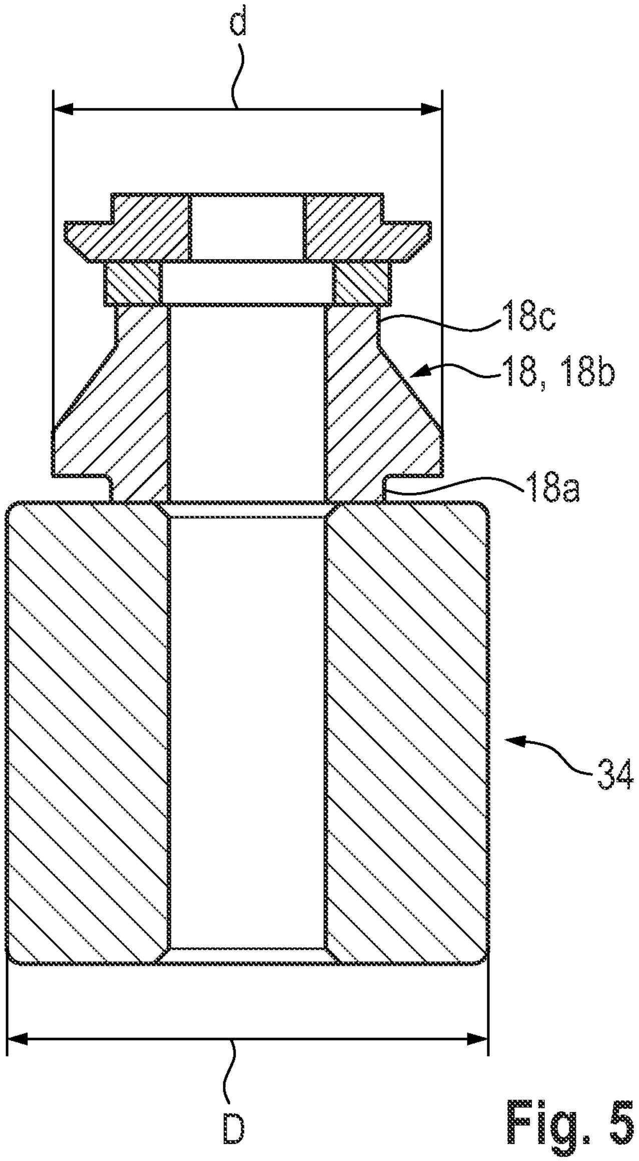
FIG. 5 is a longitudinal-sectional view of the charging contact connection according to the first embodiment.

As can be seen in particular in the sectional illustration of FIG. 5, the in particular ferritic contact element 18 has a diameter d which is dimensioned smaller than the outer diameter D of the magnetic element 34. The contact element 18 includes in this case substantially three sections **18*a*, 18*b*, 18*c*. The annular section 18*a* lies against the front face of the magnetic element 34. The frustoconical section 18*b*, which is connected to it, has a larger diameter at its base than the section 18*a*, in particular, this base diameter is the diameter d. The section 18*b* tapers along the contact pin 16 starting from the magnetic element 34 and transitions or flows into the ring-shaped section 18*c*, which has substantially the same outer diameter as the section 18*a*. The front face of the section 18*a* in this case forms the contact surface 20**.

Figure 6:
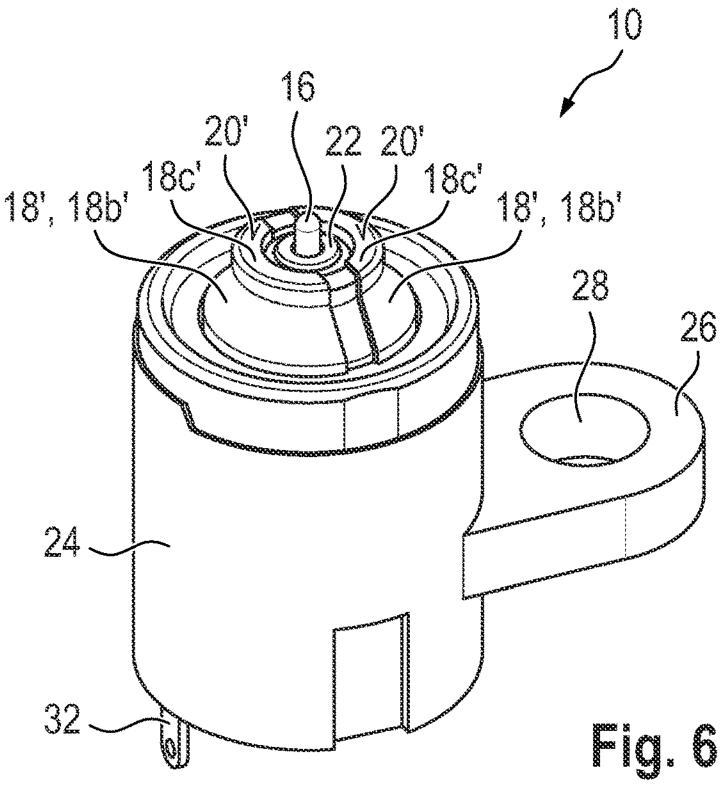
FIG. 6 is a perspective view of a first embodiment of the charging contact connection.
Figure 7:
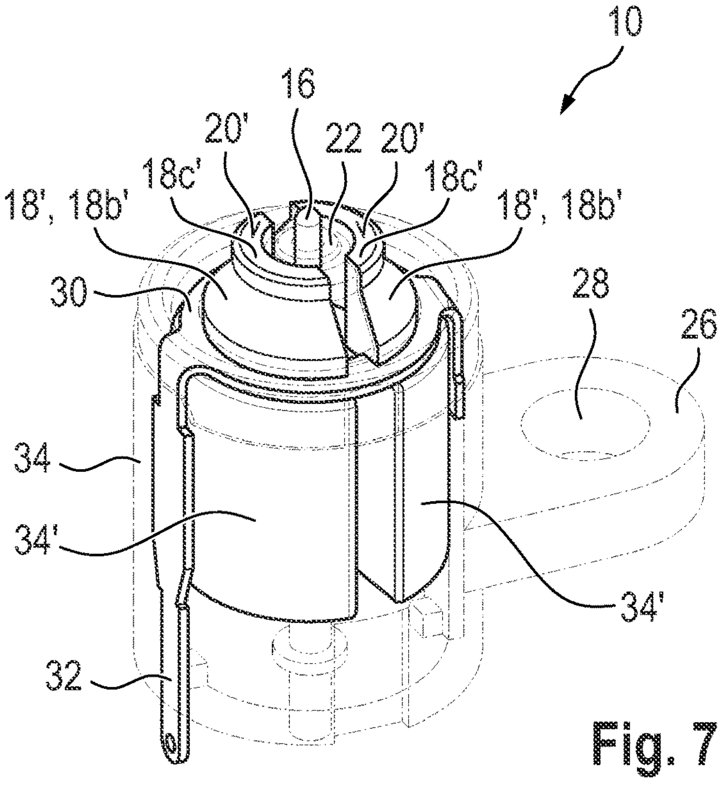
FIG. 7 is a perspective, partially transparent view of the charging connection contact according to the first embodiment.

FIG. 6 and FIG. 7 show a second exemplary embodiment of the charging plug 10. This embodiment substantially corresponds to the above-described embodiment, wherein both the magnetic element 34 and the contact element 18 are divided in respectively two halves in FIGS. 6 and 7. The magnetic element 34 is divided in this case into two ring magnet halves (semi-magnets) 34', wherein the contact element 18 is divided into two element halves 18'. The ring magnet halves 34' and the element halves 18' surround the contact pin 16 thus open in the form of a ring.

The structure of the element halves 18' corresponds analogously to the structure of the contact element 18, wherein the reference signs of the component parts are correspondingly also marked with a prime symbol ('). The element halves 18' are disposed in this case in line with a respectively assigned ring magnet half 34'. The element halves 18' are disposed spatially apart from each other, but are electrically contacted jointly with the contact ring 30. In this embodiment, the magnetic poles (N, S) of the ring magnet halves 34' are disposed in opposite directions to each other.

Figure 8:
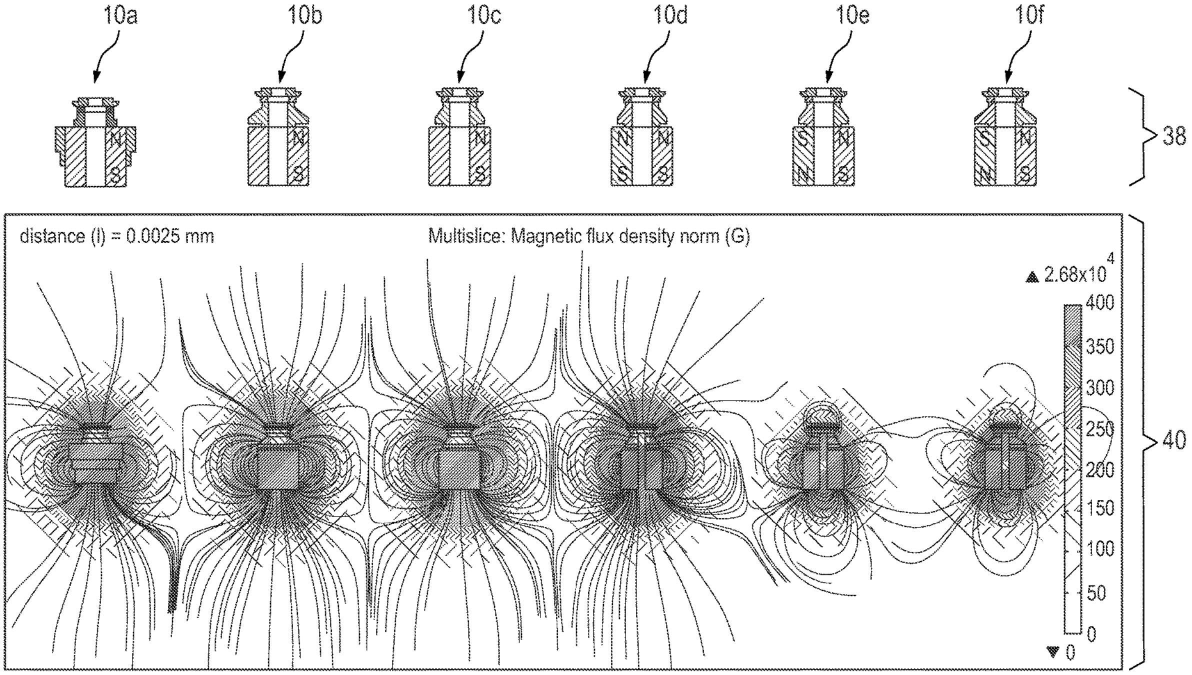
FIG. 8 is a magnetic flux diagram illustrating various embodiments of the charging contact connection.

The diagram of FIG. 8 shows two sections 38, 40 disposed horizontally one above the other. In the section 38, six different embodiments 10*a*, 10*b*, 10*c*, 10*d*, 10*e*, 10*f* of the charging plug 10 are shown. The section 40 shows corresponding simulations for the resulting magnetic attracting force or the magnetic flux.

The exemplary embodiment 10*a* is a charging plug 10 not according to the invention without the contact element 18, in which merely a conductive ring contact is disposed on the front face and around the magnetic element 34.

The exemplary embodiment 10*b* shows a charging plug 10, in which the contact element 18 has a diameter d, which is equal to the diameter D of the magnetic element 34.

Figure 3:
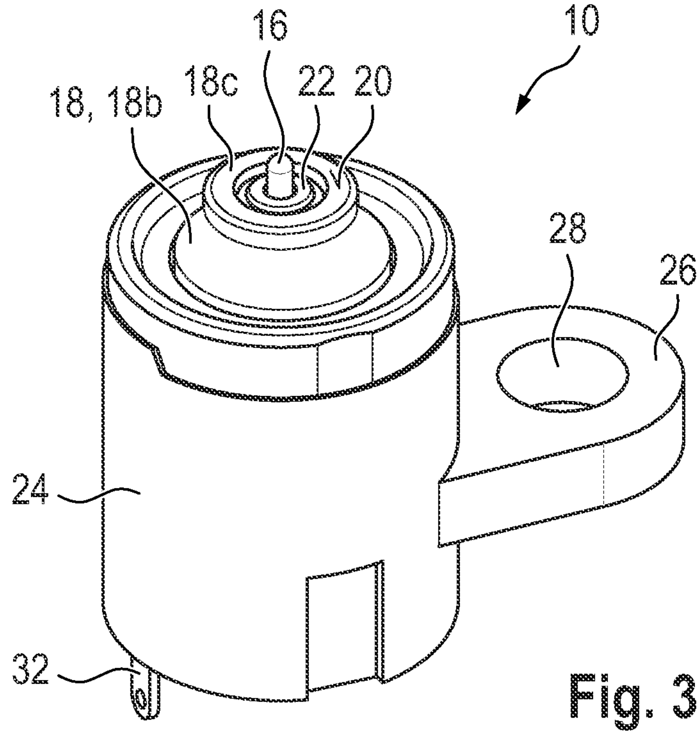
FIG. 3 is a perspective view of a first embodiment of the charging contact connection.
Figure 4:
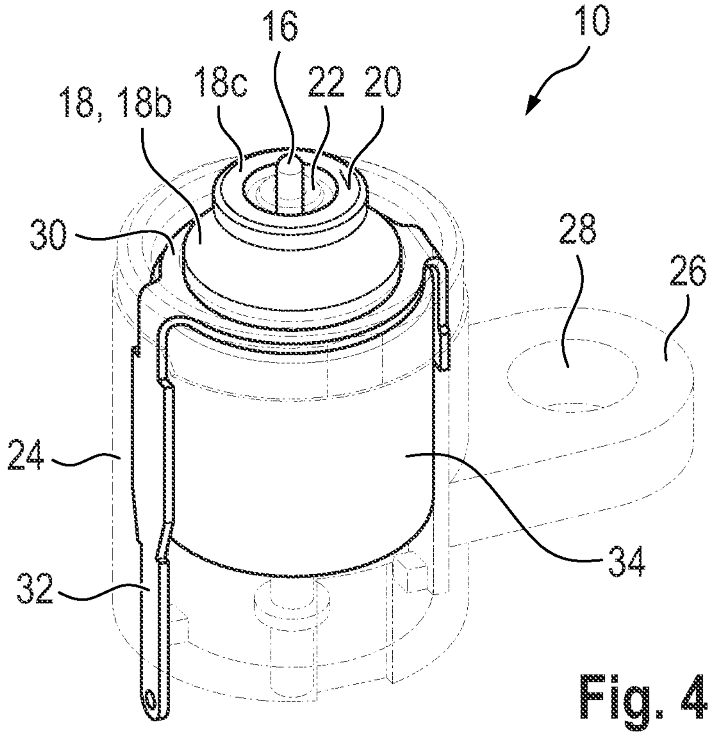
FIG. 4 is a perspective, partially transparent view of the charging connection contact according to the first embodiment.

The exemplary embodiment 10*c* corresponds to the embodiment shown in FIGS. 3 to 5, in which the diameter d of the ferritic contact element 18 is dimensioned to be smaller than the diameter D of the magnetic element 34. By reducing the diameter, a magnetic force increased by up to 20-40% compared to the exemplary embodiment 10*a* is realized.

In the exemplary embodiment 10*d*, the contact element 18 and the magnetic element 34 are divided into the element halves 18' and ring magnet halves 34', wherein the polarities or magnetic poles of the magnet halves 34' are oriented in the same direction.

The exemplary embodiment 10*e* corresponds to the embodiment of FIG. 6 and FIG. 7, in which the ferritic contact element 18 and the magnetic element 34' are divided and the polarity of the two semi-magnets 34' is inversely oriented, that is, in opposite directions to each other. In this embodiment, the range of influence of the magnetic flux is greatly reduced.

The exemplary embodiment 10*f* corresponds to the exemplary embodiment 10*e*, wherein the contact element 18' and the element halves 18' have a diameter d, which is equal to the magnet diameter D.

The claimed invention is not restricted to the above-described exemplary embodiments. On the contrary, other variants of the invention may also be derived therefrom by a person skilled in the art within the scope of the disclosed claims, without departing from the subject matter of the claimed invention. In particular, all the individual features described in connection with the various exemplary embodiments can furthermore also be combined in other ways within the scope of the disclosed claims, without departing from the subject matter of the claimed invention.

The following is a summary list of reference numerals and the corresponding structure used in the above description of the invention.

LIST OF REFERENCE SIGNS

2 Device, hearing aid
4 Housing
6 Support hook
8 Charging connection, counter-contact connection
10 Charging contact connection, charging plug
12 Contact piece, counter-contact
14 Contact piece, counter-contact
16 Contact element, contact pin
18 Contact element
18' Element half
18*a*, 18*b*, 18*b'*, 18*c*, 18*c'* Section
20, 20' Contact surface
22 Insulating sleeve
24 Housing
26 Radial arm
28 Feed-through opening
30 Contact ring
32 Contact tab
34 Magnetic element
34' Ring magnet half
36 Contact surface
38 Section
40 Section
d, D Diameter

The invention claimed is:

1. A charging contact connection for a charger of an electrical device or a hearing aid, the charging contact connection comprising:
- a front face of the charging contact connection for facing a counter-contact connection having first and second counter-contacts;
- a central contact pin for contacting the first counter-contact of the counter-contact connection;
- a permanent-magnetic magnet element for magnetically attracting the counter-contact connection, said permanent-magnetic magnet element enclosing said contact pin; and
- a contact element disposed on said front face for guiding and focusing a magnetic field of said permanent-magnetic magnetic element in a direction of the second counter-contact of the counter-contact connection, said contact element having two element halves disposed at a distance from each other.

2. The charging contact connection according to claim 1, wherein said permanent-magnetic magnetic element is a ring magnet.

3. A charging contact system for an electrical device or a hearing aid, the charging contact system comprising a charging contact connection according to claim 1.

4. The charging contact system according to claim 3, wherein said contact element has a diameter being always smaller than a diameter of said permanent-magnetic magnetic element.

5. The charging contact connection according to claim 4, wherein said diameter of said contact element tapers along said contact pin.

6. The charging contact connection according to claim 3, wherein said permanent-magnetic magnetic element is a ring magnet.

7. The charging contact connection according to claim 3, wherein said permanent-magnetic magnetic element has two magnet halves.

8. The charging contact connection according to claim 7, wherein said magnet halves have magnetic poles disposed in mutually opposite directions.

9. An electrical device or hearing aid, comprising:
- a counter-contact connection for electrically contacting a charging contact connection according to claim 1;
- said counter-contact connection having said first counter-contact for contacting said contact pin and said second counter-contact for contacting a contact surface of said contact element.

10. The electrical device or hearing aid according to claim 9, wherein said contact element has a diameter being always smaller than a diameter of said permanent-magnetic magnetic element.

11. The charging contact connection according to claim 10, wherein said diameter of said contact element tapers along said contact pin.

12. The charging contact connection according to claim 9, wherein said permanent-magnetic magnetic element is a ring magnet.

13. The charging contact connection according to claim 9, wherein said permanent-magnetic magnetic element has two magnet halves.

14. The charging contact connection according to claim 13, wherein said magnet halves have magnetic poles disposed in mutually opposite directions.

15. A charging contact connection for a charger of an electrical device or a hearing aid, the charging contact connection comprising:

a front face of the charging contact connection for facing a counter-contact connection having first and second counter-contacts;

a central contact pin for contacting the first counter-contact of the counter-contact connection;

a permanent-magnetic magnet element for magnetically attracting the counter-contact connection, said permanent-magnetic magnet element enclosing said contact pin and said permanent-magnetic magnetic element has having two magnet halves; and a contact element disposed on said front face for guiding and focusing a magnetic field of said permanent-magnetic magnetic element in a direction of the second counter-contact of the counter-contact connection.

16. The charging contact connection according to claim 15, wherein said magnet halves have magnetic poles disposed in mutually opposite directions.

* * * * *